United States Patent [19]
Colgan

[11] Patent Number: 5,956,499
[45] Date of Patent: Sep. 21, 1999

[54] METHOD AND SYSTEM FOR NON-MODEL BASED APPLICATION TRANSITIONING

[75] Inventor: John Colgan, Dublin, Ireland

[73] Assignee: Tier Technologies, Inc., Walnut Creek, Calif.

[21] Appl. No.: 08/880,847

[22] Filed: Jun. 23, 1997

[30] Foreign Application Priority Data

Jun. 25, 1996 [GB] United Kingdom .................. 9613317

[51] Int. Cl.⁶ .............................. G06F 13/12; G06F 9/44
[52] U.S. Cl. .................. 395/500.23; 395/682; 395/683; 395/705; 395/709; 707/103; 705/8
[58] Field of Search .................. 395/500, 670, 395/680, 683, 684, 701, 682, 674, 500.23, 705; 707/10, 102, 103; 705/8

[56] References Cited

U.S. PATENT DOCUMENTS

| 5,297,279 | 3/1994 | Bannon et al. | 395/600 |
| 5,485,600 | 1/1996 | Joseph et al. | 395/500 |
| 5,544,302 | 8/1996 | Nguyen | 395/155 |
| 5,634,129 | 5/1997 | Dickinson | 395/683 |

FOREIGN PATENT DOCUMENTS

| 0 583 117 A2 | 2/1994 | European Pat. Off. | G06F 9/44 |
| WO 95/18409 | 7/1995 | European Pat. Off. | G06F 9/44 |
| 0 438 843 A1 | 7/1997 | European Pat. Off. | G06F 15/40 |

*Primary Examiner*—Kevin J. Teska
*Assistant Examiner*—Thai Phan
*Attorney, Agent, or Firm*—Baker & Botts, L.L.P.

[57] ABSTRACT

The present invention includes a computer implemented system for transitioning a non-model based application to a model based application operable to execute on a particular modeling system (34) on a particular platform. The present invention includes a first module (20) for analyzing the non-model based application and generating a physical model (22) of the non-model based application. The physical model includes objects, entities, relationships, and properties from data and information within the non-model based application. A second module (24) rationalized the objects, entities, relationships and properties within the physical model (22) to generate a rationalized physical model (28). A third module (30) generates a platform dependent physical model (32) for input into the modeling system (34) from the rationalized physical model (28). An modeling system data file (26) is also included to provide information about the particular modeling system (34) to the second module (24).

12 Claims, 3 Drawing Sheets

METHOD AND SYSTEM FOR NON-MODEL BASED APPLICATION TRANSITIONING

TECHNICAL FIELD OF THE INVENTION

The present invention relates generally to model based application systems and more particularly to generating a model based application from a non-model based legacy system application.

BACKGROUND OF THE INVENTION

As they become outdated, or as business needs dictate, legacy systems, generally systems implemented on non-relational databases, are re-implemented to run on up-to-date model based systems or information repositories. These model based systems provide greater flexibility and efficiency in maintaining and upgrading the application system. Problems arise, however, in that business rules and other information integrated into these legacy systems need to be extracted and used as efficiently as possible in generating the new systems. Extracting these business rules and implementing them on a variety of models and on a variety of platforms is essential in making the transition as effortless as possible to prevent interruptions is normal business operations.

What is needed is a method and system for transitioning non-model based legacy system applications to model based systems on a variety of platforms.

SUMMARY OF THE INVENTION

The present invention includes a computer implemented system for transitioning a non-model based application to a model based application operable to execute on a particular modeling system on a particular platform. The present invention includes a first module for analyzing the non-model based application and generating a physical model of the non-model based application. The physical model includes objects, entities, relationships, and properties from data and information within the non-model based application. A second module rationalizes the objects, entities, relationships and properties within the physical model to generate a rationalized physical model. A third module generates a platform dependent physical model for input into a modeling system from the rationalized physical model. An modeling system data file is also included to provide information about the particular modeling system to the second module.

DESCRIPTION OF THE DRAWINGS

These and other features of the present invention will be readily apparent from reference to the following Drawings which include.

DESCRIPTION OF PREFERRED EMBODIMENTS OF THE PRESENT INVENTION

Figure 1:
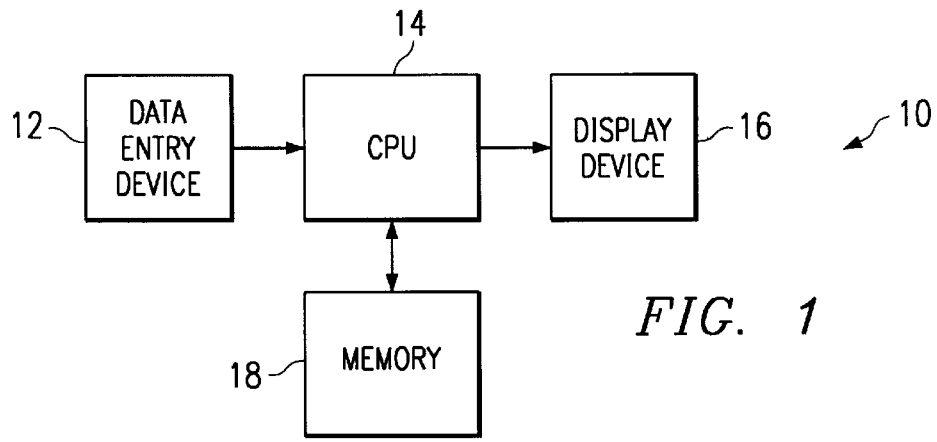
FIG. 1 is a block diagram of an exemplary computer system on which the present invention operates.

The present invention operates on a general purpose computer such as that shown at 10 in FIG. 1. The computer 10 includes a data entry device 12, a central processing unit (CPU) 14, a display device 16 and a memory 18.

Figure 2:
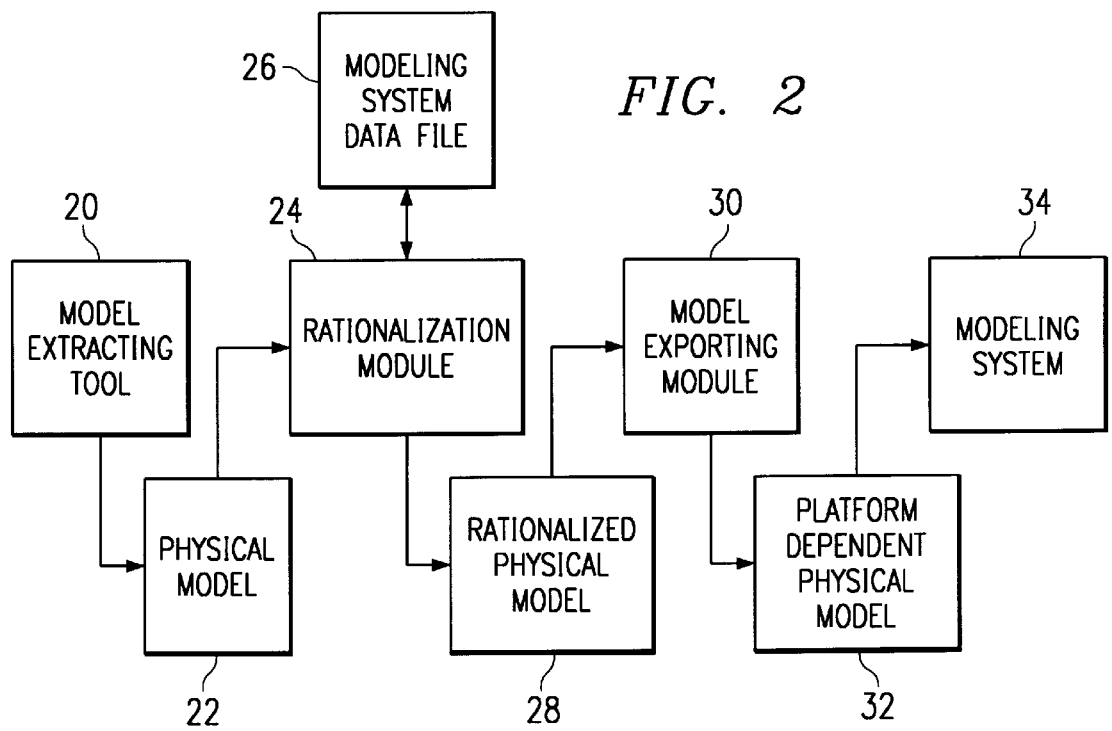
FIG. 2 is a block diagram of the present invention.

A block diagram of the preferred embodiment of the present invention is shown in FIG. 2. A model extracting tool 20, such as VIASOFT, a product of is used to generate a physical model 22 of the legacy system application being transformed. The physical model 22 is comprised of file which include information about the legacy system objects e.g. object type (fields, segments etc.) and object id, details relating to the associations between one Composer object and another, and finally details of properties, e.g. name, of a Composer object.

Various parameters can be set in executing the model extracting tool 20 to specify the amount of detail to be extracted. The amount of detail extracted can include basic details, basic details plus permitted values or basic details plus batch dialog flow details.

The rationalization module 24 rationalizes the objects exported from the model extracting tool 20 using information repository dependent information 26 to generate a rationalized physical model 28. The rationalized physical model 28 is then processed by model exporting module 30 to generate exporting models 32 which are populated into a modeling system 34 such as Composer, a product of the assignee Texas Instruments Incorporated. The rationalization module 24 also uses a bridge database 26 which includes information about the modeling system 34 which the physical model 22 is to be rationalized.

Figure 3:
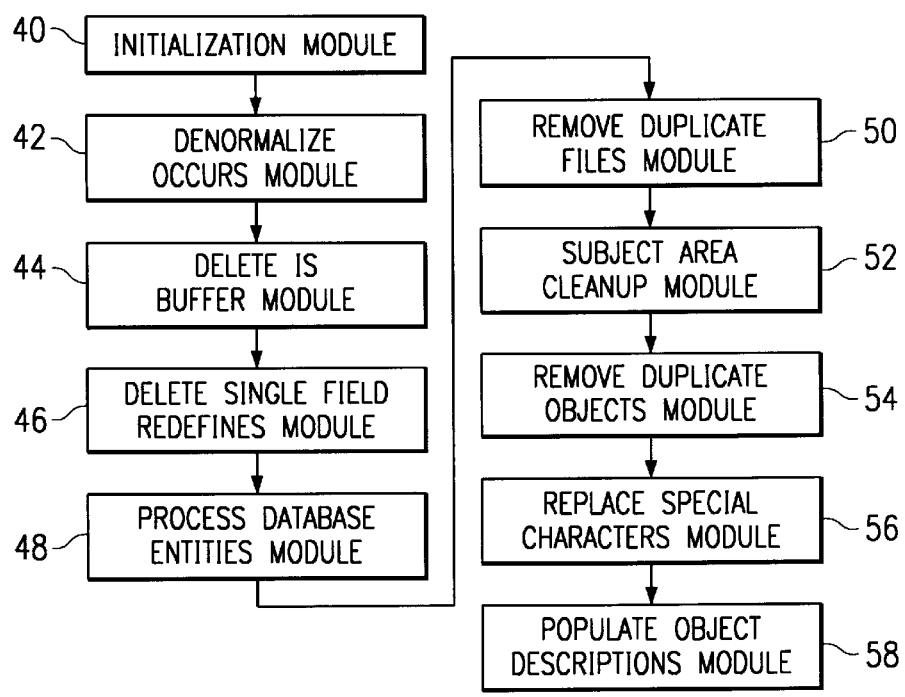
FIG. 3 illustrates a rationalization module included in the present invention in more detail.

The rationalization module 24 includes several modules, as shown in block diagram in FIG. 3. Those modules include a initialization module 40, a denormalize occurs module 42, a delete is buffer module 44, a delete single field redefines module 46, a process database entities module 48, a remove duplicate files module 50, a subject area cleanup module 48, a remove duplicate files module 50, a subject area cleanup module 52, a remove duplicate objects module 54, a replace special characters module 56 and a populate object descriptions module 58. Each of the modules which comprise the rationalization module 24 are discussed in detail hereinbelow.

The initialization module 40 clears logging tables and re-enables program options. The logging tables are used by the populate object description module 54 to build the descriptions. The initialization module 40 should also be executed before any of the other modules are executed.

The physical model 22 contains a large number of occurs type entities. A separate entity is created for each occurs clause found in a program in the legacy system application. These occurs entities contain one attribute only. Thus, a single entity in the physical model 22 can be related to a large number of occurs entities. The large number of these entities can make the physical model 22 difficult to work with. Furthermore, in themselves these occurs entities provide little added value in the physical model 22. The rationalization module 24 thus includes the denormalize occurs module 42 for denormalizing these occurs entities back into the parent entity. This results in the attribute of the occurs entity being transferred to the parent entity. It also reduces the number of entities in the physical model 22.

Figure 4A:
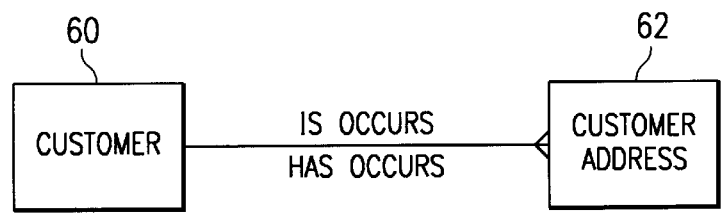
FIGS. 4A–B, 5A–B, 6A–B, 7A–B, 8A–B are entity relationship diagrams used to illustrate various features of the present invention.

In operation, the denormalize occurs module 42 finds all entities related using an 'Is Occurs' relationship. FIG. 4A shows an entity-relationship diagram which includes entities Customer 60 and Customer Address 62. The associated attributes of the entities shown in FIG. 4A are shown in Table 1 hereinbelow. The entities are related as shown in FIG. 4A through an 'Is Occurs'/'Has Occurs' relationship. In the operation of the denormalize occurs module 42, the attributes contained in the is occurs entity, Customer Address 62, are transferred to the has occurs entity, Customer 60. The attribute names are then updated as follows, New_attribute_name='Occ_'‖Old_attribute_name.

Figure 4B:
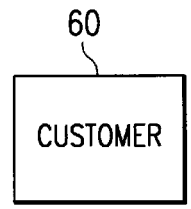

This is occurs entity, Customer Address 62, is deleted together with any relationships to it thus generating the entity relationship diagram shown in FIG. 4B. The resulting attributes in the Customer 60 entity are shown hereinbelow in Table 2.

TABLE 1

Entity Attributes Before Execution

| CUSTOMER | CUSTOMER ADDRESS |
|---|---|
| CUSTOMER_NO | CUSTOMER_ADDRESS_LINE |
| CUSTOMER_NAME | |
| CUSTOMER_TELEPHONE | |

TABLE 2

Entity Attributes After Execution

| CUSTOMER |
|---|
| CUSTOMER_NO |
| CUSTOMER_NAME |
| CUSTOMER_TELEPHONE |
| OCC_CUSTOMER_ADDRESS_LINE |

Figure 5A:
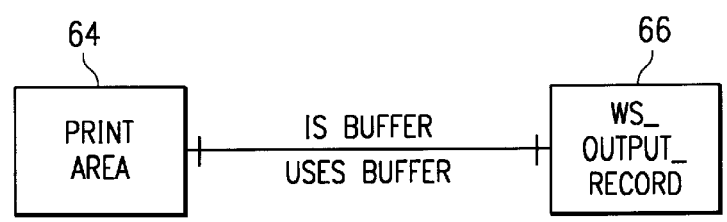

The physical model 22 may also include a number of buffer type entities such as shown in the entity-relationship diagram in FIG. 5A. These tend to include print lines or print areas of 132 bytes. They provide little or no added value in the physical model 22 and thus can be deleted as part of the rationalization module 24 processing using the delete is buffer 44. This can significantly reduce the number of entities in the physical model 22.

Figure 5B:
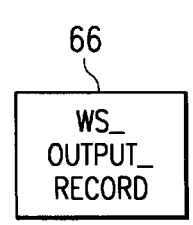

In operation, the delete is buffer module 44 detects all entities related using an 'Is Buffer' relationship. The is buffer entity, Print Area 64, is deleted together with any relationships to it. There are no expected effects for the Is Buffer Entity thus the entity-relationship diagram shown in FIG. 5B results from operation of the delete is buffer module 44.

The physical model 22 may include a large number of redefines type entities. A separate entity is created by the model extracting tool 20 for each redefines clause found in a program in the legacy system application. The majority of these redefines entities contain one attribute only. The large number of these entities can make the physical model 22 difficult to work with. In themselves these entities provide little added value in the model. Thus, the rationalization module 24 provides the delete single field redefines module 46 for detecting and deleting these single field redefines. The operation of the delete single field redefines module 46 may significantly reduce the number of entities in the physical model 22.

Figure 6A:
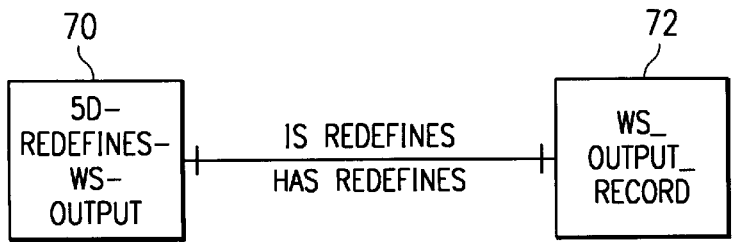
Figure 6B:
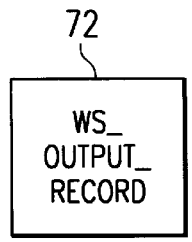

The delete single field redefines module 46 detects all entities related using an 'Is Redefines' relationship such as those shown in the exemplary entity-relationship diagram shown in FIG. 6A. If the is redefines entity, 5D-REDEFINES-WS-OUTPUT 70, has only one attribute, then it is deleted. The following line is then inserted into the description of the has redefines entity, WS-OUTPUT-RECORD 72, "Redefines: 5D-REDEFINES-WS-OUTPUT". The is redefines entity, 5D-REDEFINES-WS-OUTPUT 70, is then deleted together with any relationships to it resulting in the entity-relationship diagram shown in FIG. 6B. There are no other expected effects for the is redefines entity, 5D-REDEFINES-WS-OUTPUT 70.

The process database entities module 48 detects all entities related to a Database Entity (segment) via a "Uses Db Entity" relationship. The process database entities module 48 then selects the 'Uses Db Entity' which has the greatest number of attributes. Each attribute in the selected entity is then checked against the attributes of each of the other 'Uses Db Entities' to see if it is present in the other 'Uses Db Entity'. The overall percentage match is stored for each 'Uses Db Entity' in which one of the attributes of the selected entity is present.

The selected 'Uses Db Entity' is then deleted if it meets either of the following two criteria:

1) If the number of attributes in the selected 'Uses Db Entity' is less than or equal to 10 and if 100% of the attributes match attributes in the other 'Uses Db Entities'; or
2) If the number of attributes in the selected 'Uses Db Entity' is greater than 10 and if 95% or more of the attributes match attributes in the other 'Uses Db Entities'.

Figure 7A:
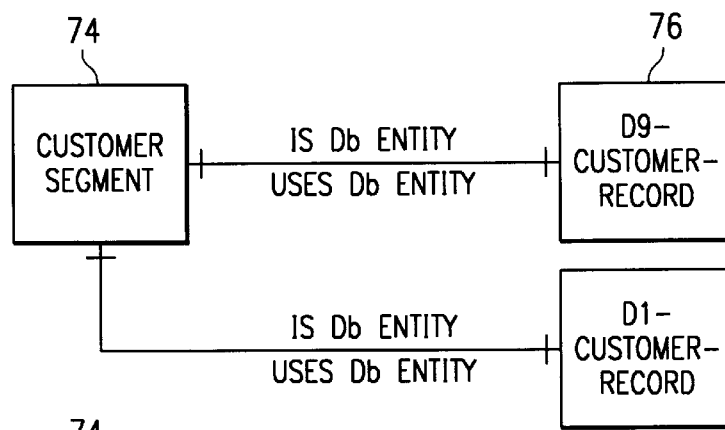
Figure 7B:
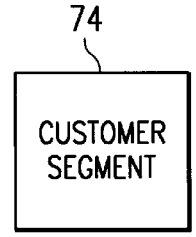

If one 'Uses Db Entity' is deleted or if there is only one 'Uses Db Entity' then the attributes of the selected entity are transferred to the 'Is Db Entity' if the specified database management system (DBMS) type is not DB2. The expected effects for the 'Uses Db Entity' are transferred to the 'Is Db Entity' before deletion. FIG. 7B illustrates the resulting entity-relationship diagram after operation of the process database entities module 48 on the exemplary entity-relationship diagram shown in FIG. 7A. The attributes associated with the entities in the entity-relationship diagram shown in FIG. 7A are shown in Table 1 hereinbelow. The resulting attributes associated with the entities in the entity-relationship diagram shown in FIG. 7B are shown hereinbelow in Table 4.

When executing the process database entities module 48, the user can set a 'Number of Initial Characters to Ignore' parameter before execution which causes the process database entities module 48 to ignore the first X characters from each attribute name while matching attributes across entities.

If, for example, the 'Number of Initial Characters to Ignore' parameter is set to 4 then the following attribute names will be regarded by the process database entities module 48 as being the same.

D409-CUSTOMER NAME
D220-CUSTOMER NAME
D1-CUSTOMER-NO
D9-CUSTOMER-NO

TABLE 3

Entity Attributes Before Execution

| CUSTOMER | D9-CUSTOMER-RECORD | D1-CUSTOMER-RECORD |
|---|---|---|
| Cust-Id | D9-Customer-No | D1-Customer-No |
| | D9-Customer-Name | D1-Customer-Name |
| | D9-Customer-Tel-No | D1-Customer-Tel-No |
| | D9-Customer-Address-1 | D1-Customer-Address-1 |
| | D9-Customer-Address-2 | D1-Customer-Address-2 |
| | D9-Customer-Address-3 | D1-Customer-Address-3 |

TABLE 4

Entity Attributes After Execution

CUSTOMER

D9-Customer-No
D9-Customer-Name
D9-Customer-Tel-No
D9-Customer-Address-1
D9-Customer-Address-2
D9-Customer-Address-3

Using the exemplary entity-relationship diagram shown in FIG. 7A, the process database entities module 48 selects D9-Customer-Record 76 as the selected entity. This reason for this is that even though D9-Customer-Record 76 and D1-Customer-Record 78 have the same number of attributes, the process database entities module 48 finds the D9- Customer-Record 76 entity first. The process database entities module 48 then determines if each attribute in the selected entity (D9-Customer-Record 76) is present in each of the other 'Uses Db Entities', i.e., D1-Customer-Record 71. The process database entities module 48 then calculates a percentage match for each 'Uses Db Entity' against the selected entity (100% in this example). The 'Uses Db Entity' (D1-Customer-Record 78) is then deleted because it meets the first criteria specified hereinabove.

The expected effects from the two records in the entity D1-Customer-Record 78 are then passed to the entity Customer Segment 74. The description of the D9-Customer-Record 78 is updated as follows (assuming that D1-Customer-Record 78 is referenced in a program named PFTP001), Deleted Records: PFTP001 D1-Customer-Record The parameter Number of Initial Characters to Ignore has been set to 3 in this case. This causes the process database entities module 48 to ignore the 'D9' in the entity D9-Customer-Record 76 and to ignore the 'D1-' in the entity D1-Customer-Record 78 when checking the attribute names.

The remove duplicate files module 50 checks for duplicate entities in a subject area. Initially the remove duplicate files module 50 selects the entity with the greatest number of attributes. It then checks the attributes of this selected entity against the attributes of each of the other entities in the subject area. The overall percentage match is stored for each entity.

The entity is deleted if it meets either of the following two criteria,

1) If the number of attributes in the 'Uses Db Entity' is less than or equal to 10 and if 100% of the attributes match; or 2) If the number of attributes in the 'Uses Db Entity' is greater than 10 and if 95% or more of the attributes match.

If the number of attributes in the entity is less than 3 then the entity names must also match before the entity will be deleted.

The remove duplicate files module 50 does not transfer attributes between entities. The expected effects for the deleted entity are transferred to the selected entity. Also, all relationships from the deleted record are transferred to the selected record.

Once all entities in the subject area have been checked against the selected entity, a new selected entity is select based on the number of attributes. The attribute matching and entity deletion process is repeated until all entities have been selected.

As noted hereinabove, the user can specify certain parameters to control attribute matching across entities. In addition to the 'Number of Initial Characters to Ignore' parameter, a 'Number of End Characters to Ignore' and an 'Ignore Numeric Characters' parameter are also available.

If, for example, the 'Number of End Characters to Ignore' parameter is set to 4 then the following attributes will be regarded as being the same.

CUSTOMER-NAME-D409
CUSTOMER-NAME-D220

If, for example, the 'Ignore Numeric Characters' parameter is set to 1 then the following attributes will be regarded as being the same.

INPUT-REC-DATA
INPUT-REC-DATA1

The following attributes will also be regarded as being the same if the 'Ignore Numeric Characters' parameter is set to 1. In other words, a setting of 1 means to ignore 1 numeric character.

INPUT1-REC-DATA
INPUT-REC-DATA

TABLE 5

Entity Attributes Before Execution

| HEADER-REC1 | HEADER-REC2 | TRAILER-REC1 | TRAILER-REC2 |
|---|---|---|---|
| Customer-No | Customer-No | FILLER-1 | FILLER-1 |
| Customer-Name | Customer-Name | Total_Bill_Amt | Total_Bill_Amt |
| Customer-Tel-No | Customer-Tel-No | | |
| Customer-Address-1 | Customer-Address-1 | | |
| Customer-Address-2 | Customer-Address-2 | | |
| Customer-Address-3 | Customer-Address-3 | | |
| FILLER-1 | FILLER-1 | | |

As an example, suppose for entities HEADER-REC1, HEADER-REC2, TRAILER-REC1, and TRAILER-REC2 with the attributes as shown hereinabove in Table 5 are included in the physical model 22 currently being processed by the remove duplicate files module 50. Suppose further that the remove duplicate files module 50 selects the entity HEADER-REC1 as the selected entity. This reason for this is that even though the entities HEADER-REC1 and HEADER-REC2 have the same number of attributes, the entity HEADER-REC 1 is detected first. The remove duplicates file module 50 then determines if each attribute in the selected entity (HEADER-REC1) is present in each of the other entities in the same subject area (HEADER-REC2, TRAILER-REC1, and TRAILER-REC2). The remove duplicate files module 50 then calculates a percentage match for each of the other entities against the selected entity (100%, 14%, and 14% in this example). In this example, the remove duplicate files module 50 then deletes the entity HEADER-REC2 because it passes the first criteria specified hereinabove. The expected effects for HEADER-REC2 are transferred to HEADER-REC1 and the description of HEADER-REC1 is updated as follows:

Deleted Records: PFTP002 Header-Rec2.

The entity HEADER-REC1 is then marked as processed and therefore it is not checked again. The remove duplicate files module 50 then chooses TRAILER-REC1 as the next selected entity and determines if each attribute in this selected entity (TRAILER-REC1) is present in each of the other unmarked entities (TRAILER-REC2) in the subject area. The remove duplicate files module 50 then calculates a percentage match for TRAILER-REC2 against the selected entity (100% in this example). The entity TRAILER-REC2 is then deleted because it passes the first criteria specified hereinabove. The expected effects for TRAILER-REC2 are transferred to TRAILER-REC1. The description of TRAILER-REC1 is then updated as follows:

Deleted Records: Trailer-Rec2.

The parameter 'Number of Initial Characters to Ignore', discussed hereinabove, is set to 3 in this case which causes the remove duplicate files module 50 to ignore the first 3 characters when checking the attribute names. The resulting entities and their associated attributes after processing by the remove duplicate files module 50 are shown in Table 6 hereinbelow.

TABLE 6

Entity Attributes After Execution

| HEADER-REC1 | TRAILER-REC1 |
|---|---|
| Customer-No | FILLER-1 |
| Customer-Name | Total_Bill_Amt |
| Customer-Tel-No | |
| Customer-Address-1 | |
| Customer-Address-2 | |
| Customer-Address-3 | |
| FILLER-1 | |

The subject area cleanup module 52 performs two functions. First, the subject area cleanup module 52 deletes a subject area containing no entity types. Second, if a subject area contains a single entity type, then this entity type is renamed using the subject area name and the entity type is transferred to the next hightest subject area. The subject area is then deleted. If the next highest subject area is the root subject area level, then the entity type is transferred to a subject area called system files. The description of the entity type is updated to record the name prior to update.

Hereinbelow an exemplary Data Model List is shown before being processed by the subject area cleanup module 52. The exemplary Data Model List includes a root level subject area named 'Customer Model' and the subject areas 'New Customer File', 'Customer Empty Area', 'Customer Database' and 'Old Customer File'.

BEFORE EXECUTION - DATA MODEL LIST

| Customer Model | (Root Level Subject Area) |
|---|---|
| New Customer File | (Subject Area) |
| WS-INPUT-RECORD | (Single entity type) |
| Customer Empty Area | (Subject Area) |
| Customer Database | (Subject Area) |
| CUSTOMER | (Single entity type) |
| CUSTOMER ADDRESS | (Single entity type) |
| Old Customer | (Subject Area) |
| WS-OUTPUT-RECORD | (Single entity type) |

After execution of the subject area cleanup module 52, the exemplary Data Model List is as follows.

AFTER EXECUTION - DATA MODEL LIST

| Customer Model | (Root Level Subject Area) |
|---|---|
| System Files | (New Subject Area) |
| NEW_CUSTOMER_FILE | (Single entity type) |
| OLD_CUSTOMER_FILE | (Single entity type) |
| Customer Database | (Subject Area) |
| CUSTOMER | (Single entity type) |
| CUSTOMER ADDRESS | (Single entity type) |

In addition, the subject area cleanup module 50 inserts the line "Renamed From: WS-INPUT-RECORD" into the description of the NEW_CUSTOMER_FILE entity type. The description of the entity type OLD_CUSTOMER_FILE is amended in the same fashion.

The remove duplicated objects module 54 performs the following functions. First, it ensures that all object names are unique throughout the physical model 22. Second, it removes duplicate relationships. Third, the remove duplicate objects module 54 removes duplicate Permitted Values. Fourth, the remove duplicates objects module 54 optionally removes all attributes containing a given string. Fifth, the remove duplicate objects module 54 optionally remove all characters in attribute names up to the first hyphen or underscore matching a given edit pattern. Finally, the remove duplicate objects module 54 optionally changes all parent child relationships to one to many. Each of these functions are examined in turn.

The remove duplicate objects module 54 checks each object name to ensure that it is unique across the physical model 22. It checks Subject Areas, Entity Types, Functions, and Attribute Names for uniqueness. If the remove duplicate objects module 54 detects two objects with the same name in the physical model 22, it adds a six digit number to the front of one of the names. If an entity contains two attributes with the same name, e.g., Filler, Filler, then the remove duplicate object module 54 appends a 2 digit number to the end of the attribute name, so that, for example, the first occurrence of FILLER becomes FILLER-01 and the second occurrence of FILLER becomes FILLER_02.

TABLE 7

Examples of the operation of remove duplicate object module 54 on duplicate object names.

| OBJECT TYPE | OBJECT NAME BEFORE | OBJECT NAME AFTER |
|---|---|---|
| Entity Type | Customer | Customer |
| | Customer | 011223_ Customer |
| | Customer | 006234_ Customer |
| Function | PFTP001 | PFTP001 |
| | PFTP001 | 233231_PTFP001 |
| Attribute | E5-FILLER-1 | (in Customer E5-FILLER-1 Entity Type) |
| | E5-FILLER-1 | (in Customer E5-FILLER-1_01 Entity Type) |

Figure 8A:
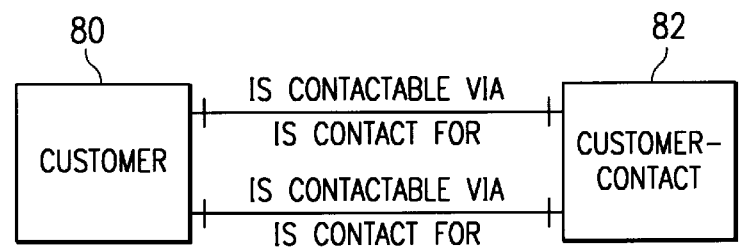
Figure 8B:
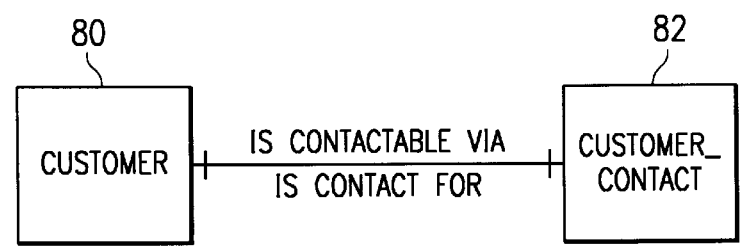

The physical model 22 may include a number of duplicate relationships. This means that two entity types are related via the same relationship twice as illustrated in FIG. 8A where the entity Customer 80 is related to the entity Customer_Contact 82 by the relationship 'Is Contractible Via/Is Contact For' twice. These duplicate relationships are handled by the remove duplicate objects module 54 resulting in the entity-relationship diagram shown in FIG. 8B where the entity Customer 80 is now related to the entity Customer_Contact 82 through the 'Is Contractible Via/Is Contact For' only once.

The remove duplicate objects module 54 also checks the permitted values for each attribute in the physical model 22 for uniqueness as shown in the example below.
BEFORE
Attribute Customer_Type_Code has permitted values, 'A', 'B', 'B', 'C'
AFTER
Attribute Customer_Type_Code has permitted values, 'A', 'B', 'C'

The remove duplicate objects module 54 further allows the user to remove all attributes from the physical model 22 containing a certain string. For example, if the user specifies the string as 'FILLER' then all attributes containing 'FILLER' in their name will be deleted. The description of the parent entity type is updated to reflect deletion of the attribute.

The remove duplicate objects module 54 is further provides the user with the option to changes all parent child relationships in the physical model 22 from a cardinality of one to one to a cardinality of one to many.

The remove duplicate objects module 54 further provides the option to remove all characters up to the first hyphen (or underscore) from all attribute names in the physical model 22. The user can specify an edit pattern and the remove duplicate objects module 54 ensures that each character follows the specified pattern. If any character fails to meet the edit pattern then the attribute name is not changed. Tables 8 and 9 hereinbelow show, respectively, examples with no edit patterns specified and with an edit pattern specified.

TABLE 8

Example - No Edit Pattern Specified

| Attribute Name Before Execution | Attribute Name After Execution |
|---|---|
| CUSTOMER-NAME | NAME |
| D9-CUSTOMER-NO | CUSTOMER-NO |
| TELEPHONE-NO | NO |
| D509-EFT-BANK-ID-NO | EFT-BANK-ID-NO |

It is not advisable to execute this option without specifying an edit pattern.

TABLE 9

Example - Edit Pattern Specified as A999

| Attribute Name Before Execution | Attribute Name After Execution |
|---|---|
| CUSTOMER-NAME | CUSTOMER-NAME |
| D9-CUSTOMER-NO | CUSTOMER-NO |
| TELEPHONE-NO | TELEPHONE-NO |
| D509-EFT-BANK-ID-NO | EFT-BANK-ID-NO |
| 9D-FILLER-1 | 9D-FILLER-1 |

As discussed hereinabove, the remove duplicate objects module 54 checks each character up to the first hyphen against the corresponding character in the edit pattern. The exemplary edit pattern A999 used in the example shown in Table 9 hereinabove specifies that the first character must be an alphabetic character and that the second, third and fourth must be numeric. The remove duplicate objects module 54 only checks the characters up to the first hyphen in the attribute name. In the example shown in Table 9 hereinabove, both D409 and D9 pass the check against the edit pattern.

Returning to FIG. 3, the rationalize module 24 further includes a replace special characters module 56 which replaces all occurrences of a certain character in an object name, e.g., a hyphen, with another character, e.g., an underscore. Table 10 shows exemplary specifications supplied to the replace special characters module 56. Table 10 describes which characters are replaced and by what. Table 11 hereinbelow illustrates operation of the replace special characters module 56 using the specifications given in Table 10.

TABLE 10

Exemplary special characters

| Character | Replaced By |
|---|---|
| Hyphen '-' | Underscore '_' |
| Left Parentheses '(' | Underscore '_' |
| Right parentheses ')' | Underscore '_' |
| Plus Sign '+' | Underscore '_' |
| Dot '.' | Underscore '_' |
| Ampersand '&' | String 'Tmp_' |
| Double Ampersand '&&' | String 'Prm_' |

TABLE 11

Examples

| Before Replacing Name | After Replacing Name |
|---|---|
| CUSTOMER-NAME | CUSTOMER_NAME |
| &&ZCFT.FILENAME | PRM_ZCFT_FILENAME |
| &ZCFT.FILENAME | TMP_ZCFT_FILENAME |
| CUSTOMER(NAME)+ | CUSTOMER_NAME_ |

Note that only object names are affected so any character occurring as a permitted value will not be changed.

The populate object descriptions module 58 populates descriptions for the following model objects, Subject Areas, Entity Types, Attributes and Functions
The general description layout is as follows,
Legacy Name:
Desc:
The legacy name is the same as the object name. The reason for populating the legacy name here is that the object will most probably be renamed during the analysis phase of the project and thus this name provides a trace back to the existing system.

Some additional lines may be added to the descriptions of certain entity types. For example, if an entity type (Input Record) was renamed to a subject area name, the following line would be added to the description of the entity type.
Renamed From: Input Record
Also if the entity type was related to another entity type via an 'Is Db Entity' relationship and the 'Uses Db Entity' (D4-CUSTOMER-RECORD) was deleted under the Process Db Entity option then the following line would be added to the description of the entity type.
Deleted Records: PROG0001 D4-CUSTOMER-RECORD
The name of the program referencing the D4-CUSTOMER-RECORD is also displayed in the description of the 'Is Db Entity'.

Finally, after the rationalized physical model 28 is generated, the model exporting module 30 is executed to generate a platform dependent physical model 32 from the rationalized physical model 28 generate by the rationalization module 24.

In the current embodiment of the present invention, the platform dependent physical model 32 generated by the model exporting module 30 is a checkout file which is used by Composer to create Composer models with which to populate the modeling system 34.

Although the present invention and its advantages have been described in detail, it should be understood that various changes, substitutions and alterations can be made herein without departing from the spirit and scope of the invention as defined by the appended claims.

What is claimed is:

1. A computer implemented system for transitioning a non-model based application to a model based application operable to execute on a particular application program modeling system on a particular platform comprising:

an information repository database based on the particular application program modeling system;

a first module for analyzing the non-model based application and generating a physical model of the non-model based application based on data and information within the non-model based application, said physical model representing a plurality of application objects, a plurality of database entities, a plurality of relationships between said application objects, and a plurality of application object properties of the non-model based application, each of said application objects having an object name;

a second module responsive to said first module for rationalizing said application objects, said database entities, said relationships and said application object properties within said physical model to generate a rationalized physical model having a selected group of said application objects, said database entities, said relationships and said application object properties from said physical model used by a third module, said selected group being selected based on said information repository database; and said third module being responsive to said second module for generating a platform dependent physical model for input into the particular application program modeling system from said rationalized physical model.

2. The system of claim 1 wherein said second module includes an initialization module for initializing a plurality of user defined parameters.

3. The system of claim 1 wherein said second module further includes a denormalize occurs module which transfers an attribute of an is occurs database entity to an associated has occurs database entity thereby reducing the number of said database entities in said physical model.

4. The system of claim 1 wherein said second module further includes a delete is buffer module for deleting buffer type entities thereby reducing the number of said database entities in the physical model.

5. The system of claim 1 wherein said second module further includes a delete single field redefines module for deleting redefines entities which contain only one attribute from said physical model thereby reducing the number of said database entities in said physical model.

6. The system of claim 1 wherein said second module further includes a process database entities module for using a portion of said relationships to detect said database entities which are associated with a database segment, matching attributes included in each of said database entities in accordance with predetermined matching criteria, and deleting a selected group of said database entities based on a predetermined threshold.

7. The system of claim 1 wherein said second module further includes a remove duplicate files module for removing duplicate database entities in a subject area.

8. The system of claim 1 wherein said second module further includes a subject area cleanup module for removing a subject area if said subject area is empty and for merging said subject area with a higher subject area if said subject area includes a single entity type.

9. The system of claim 1 wherein said second module further includes a remove duplicate application objects module for ensuring unique object names through said physical model, for removing duplicates of said relationships, for removing duplicate permitted values, for modifying an attribute in accordance with predetermined criteria, and for modifying a selected group of said relationships from many-to-many to one-to-one.

10. The system of claim 1 wherein said second module further includes a replace special characters module for replacing all occurrences of a first predetermined character string in said object names with a second predetermined character string.

11. The system of claim 1 wherein said second module further includes a populate object descriptions module for inserting information describing each of said objects.

12. A computer implemented method of transitioning a non-model based application to a model based application operable to execute on a particular application program modeling system on a particular platform comprising the steps of:

analyzing the non-model based application;

generating a physical model of the non-model based application based on data and information within the non-model based application, said physical model representing a plurality of application objects, a plurality of database entities, a plurality of relationships between said application objects, and a plurality of application object properties of the non-model based application;

rationalizing said application objects, said database entities, said relationships and said application object properties within said physical model to generate a rationalized physical model having a selected group of said application objects, said database entities, said relationships and said application object properties from the physical model, said selected group being selected based on said information repository database; and generating a platform dependent physical model for input into the particular application program modeling system from said rationalized physical model.

* * * * *